INVENTORS
Robert E. Bible
Robert L. McIntyre
Arville T. Trostrud
Robert R. Williamson
By Francis L. Masselle
S.A. Giovanetti
Attorneys INVENTORS:
Robert E. Bible
Robert L. McIntyre
Arville T. Trostrud
Robert R. Williamson
By Francis L. Masselle
S A Giarratana
Attorneys

MODULAR COMPUTER BUILDING BLOCK

Original Filed April 19, 1962 5 Sheets-Sheet 3

Fig. 4 (Memory Unit-20-)

INVENTORS:
Robert E. Bible
Robert L. McIntyre
Arville T. Trostrud
Robert R. Williamson
By Francis L. Masselle
S. A. Giarratana
Attorneys

MODULAR COMPUTER BUILDING BLOCK

INVENTORS:
Robert E. Bible
Robert L. McIntyre
Arville T. Trostrud
Robert R. Williamson
Francis L. Mandle
By S.A. Giarratana
Attorneys MODULAR COMPUTER BUILDING BLOCK
Original Filed April 19, 1962 5 Sheets-Sheet 5
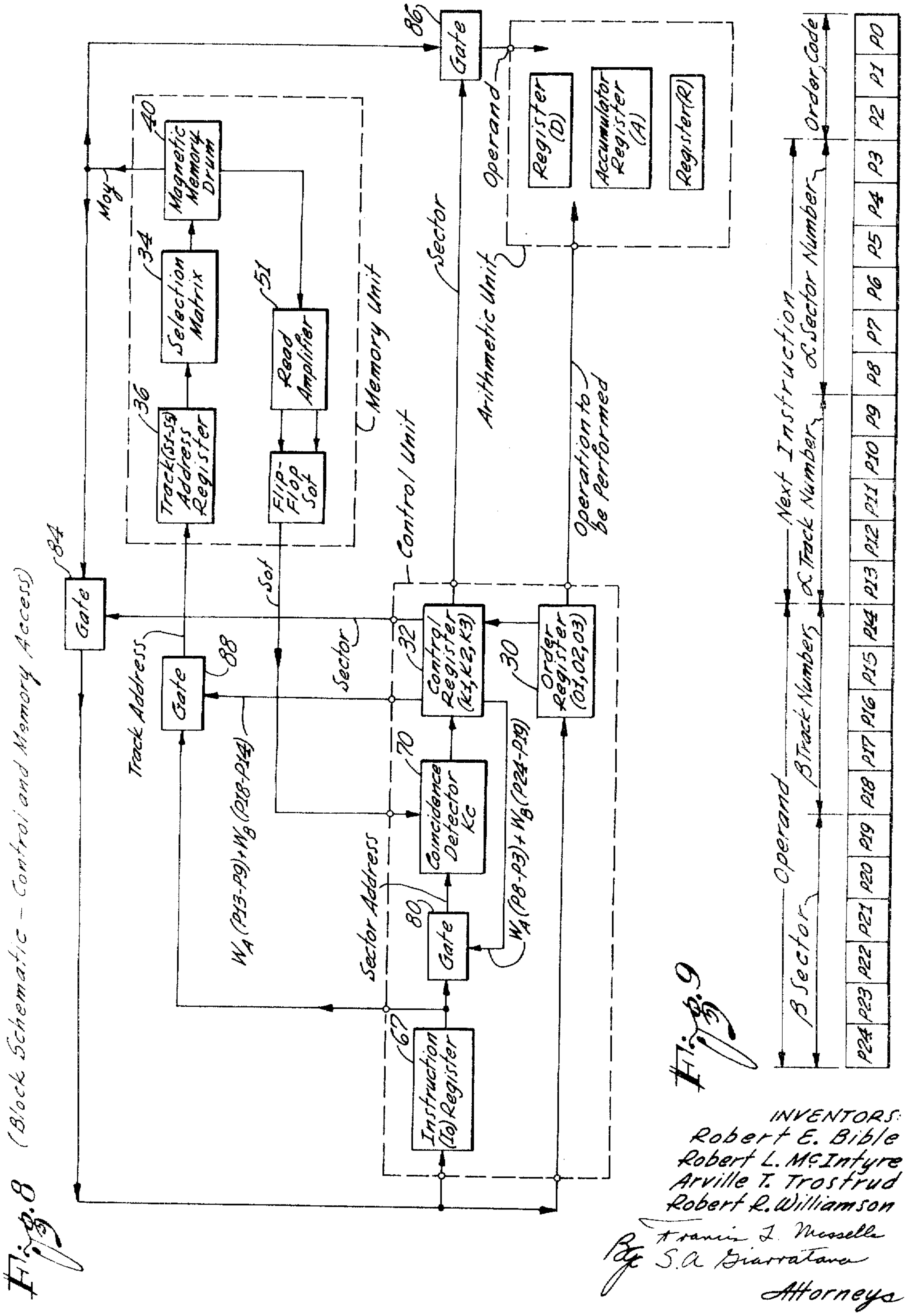
Fig. 8 (Block Schematic – Control and Memory Access), Fig. 9
INVENTORS:
Robert E. Bible
Robert L. McIntyre
Arville T. Trostrud
Robert R. Williamson
By Francis L. Masselle
S. A. Giarratana
Attorneys

United States Patent Office 3,312,954

Patented Apr. 4, 1967

3,312,954

MODULAR COMPUTER BUILDING BLOCK

Robert E. Bible, Rancho Santa Fe, and Robert L. McIntyre, Glendale, Calif., Arville T. Trostrud, Butler, N.J., and Robert R. Williamson, Carlsbad, Calif., assignors to General Precision, Inc., a corporation of Delaware

Continuation of application Ser. No. 189,010, Apr. 19, 1962. This application Dec. 8, 1965, Ser. No. 512,466
6 Claims. (Cl. 340—172.5)

The present invention relates to digital computers, and it relates more particularly to an improved type of digital computer sub-system which exhibits a high degree of reliability and adaptability.

This application is a continuation of copending application Ser. No. 189,010, which was filed Apr. 19, 1962, and is now abandoned.

The computer of the present invention will be referred to herein as the "building block computer." The building block computer of the present invention utilizes a plurality of individual electronic computers which are intercoupled, as will be described, to provide high reliability through redundancy. Each computer includes, for example, a control unit and an arithmetic unit. Each computer, in conjunction with a common memory unit and a common service unit, performs redundantly all the computational operations normally performed by a single general purpose computer.

All of the individual computers of the building block computer of the invention are electronically isolated, as described and claimed, for example, in copending application Ser. No. 221,544, entitled Digital Computer System, which was filed Sept. 5, 1962, in the name of Arville T. Trostrud, Jr., and is now abandoned. As described in the copending application, even though the individual computers are electronically isolated, they are functionally intercoupled through the common memory unit.

By the application of the concepts of the present invention, increased reliability is achieved to a dramatic extent.

A second important objective of the invention is to achieve flexibility in the design, permitting the building block computer to be applied to a variety of requirements in different environments. For example, in the weapons field, the building block computer of the present invention has the potential of serving as an important sub-system for the overall weapons system. Heretofore, no digital computer sub-system has been developed which is so readily adaptable for service in the many different types of present day weapons systems as that contemplated by the present invention; nor have such prior computer subsytems heretofore exhibited, to the same degree as the present invention, the reliability required in such weapons systems.

The building block computer of the invention is an improved computer system which operates on a periodic program sequence. That is, the orders in the program are executed in sequence, until all have been executed, and then the sequence, or another, is started again.

The instructions for the building block computer of the invention may be considered to be arranged in an imaginary loop, representing the program, with a control unit for the arithmetic units moving around the loop. If high computational speed is required, more arithmetic units are added, and this also increases the redundancy reliability. For example, if there are "N" arithmetic units disposed around the program loop, each instruction will be performed with "N" times the frequency as with a single arithmetic unit.

Furthermore, all the arithmetic units referred to in the preceding paragraph may operate on a common memory, so that they can share sub-routines, sub-checking programs, and so on. If one or more of the arithmetic units fails, it drops out of the system and the system proceeds with a computational speed reduced to "$n-1$" with no change in function.

It is, accordingly, an object of the present invention to provide an improved building block computer which is capable of high computational speeds with relatively simple circuitry and equipment, and which exhibits redundancy characteristics for high reliability.

Another important object of the invention is to provide such an improved building block computer which is extremely flexible and adaptable to a wide variety of applications.

A feature of the building block computer of the invention, therefore, is that the capabilities of the basic computer sub-system can be increased or decreased, merely by the addition or subtraction of the independent units of the computer sub-system. In this manner, the requirements of any particular system can be met, and the building block computer of the invention can be tailored to that particular system.

Another feature of the building block computer of the invention is that redundant units can be provided so that in the event of failure of any of the units, the computer will continue to operate.

In the embodiment of the invention to be described, for example, each of the individual computers of the building block computer are simple arithmetic and control units. Each of these units, in conjunction with a common memory unit, for example, and a common service unit, are capable of performing all the computational steps required for the system, but not necessarily at the required solution rate.

The individual computers in the embodiment to be described are almost completely isolated from one another in an electrical and electronic sense. The transmission of information to any one of the units is made directly from the common memory unit, and the transfer of information from one computer to another is effectuated through the common memory unit.

Further objects and advantages of the invention will become apparent from a consideration of the specification, when the specification is taken in conjunction with the accompanying drawings, in which:

FIGURE 8 is a schematic diagram useful in explaining the operation of each of the individual general purpose computers;

FIGURE 9 is a representation of the composition of the instruction word used in the general purpose computers.

Figure 1:
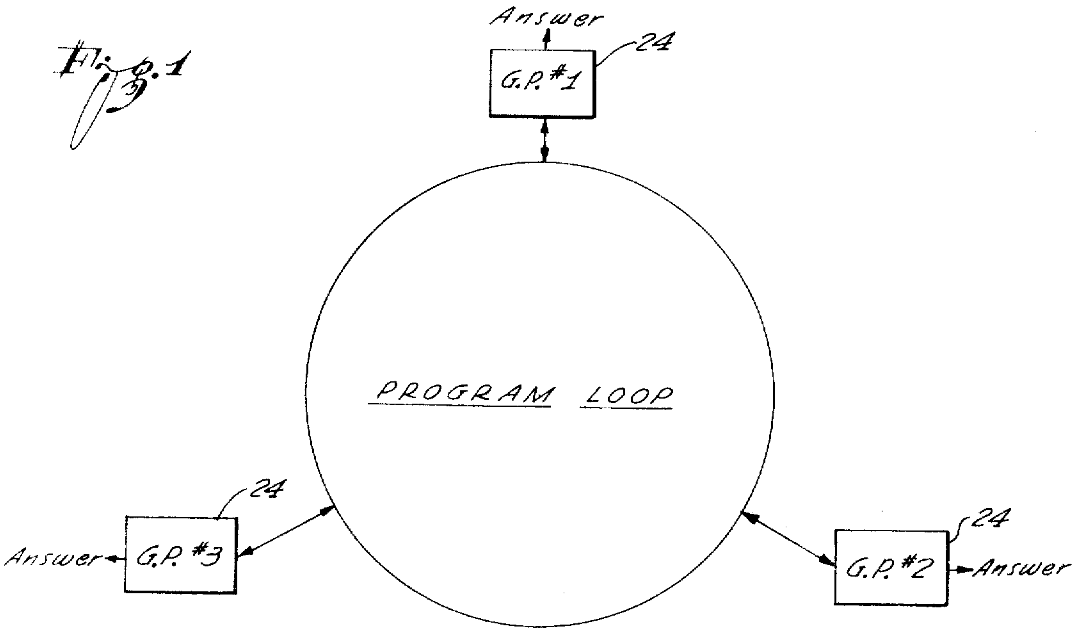
FIGURE 1 is a schematic block diagram useful in explaining the concepts of the invention.

As mentioned above, the building block computer of the present invention utilizes a multiplicity of individual general purpose computers. The disposition of a plurality of individual general purpose computers 24 about a program loop is shown schematically in FIGURE 1. The general purpose computer units are organized, as will be described, to provide an increased problem solution rate, in addition to increased reliability through redundancy.

The concept of the building block computer of the invention is particularly advantageous for use in real-time problems, where the computer program consists of a set of equations which must be solved over and over again as the input parameters change.

With a single general purpose computer unit operating on a program loop, a solution is obtained, for example, every "T" seconds. If the entire program and all input information are made available to "N" number of general purpose computers 24, and all the general purpose computers solve the entire program, then there are "N" solutions in the time it previously took for one solution.

The starting point for the second general purpose computer in the building block computer is T/N seconds into the program; the third general purpose computer unit starts 2T/N into the program, and so on. This means that the general purpose computers are spaced in time evenly throughout the program loop. Thus, a complete new solution is available every T/N seconds.

In the event of a failure in one of the individual general purpose computers, it may be removed from the program loop, in the manner described and claimed, for example, in copending application Ser. No. 239,651, filed Nov. 23, 1962, in the name of Kinsinger et al., assigned to the present assignee and now abandoned. The program then continues to be completely solved by the remaining units.

Under program control, when one or more of the general purpose computers fail, the remaining general purpose computers may be re-spaced, through proper time delays, throughout the program, if desired. The computation now continues at a slower rate, which may reduce slightly the accuracy of some solutions.

A further advantage provided by the building block computer is the improved solution accuracy due to the reduction of transport lags which exist in all present day computing systems. Basically, this advantage is realized by using the most up-to-date information available to solve the problem. That is, the most recent input information is used, as well as the most up-to-date intermediate calculations available.

As any one of the general purpose computer units advances through the program loop, many intermediate values are calculated by it, to be used in later steps. By the time an intermediate value is to be used by any given one of the general purpose computers, it may have been computed anew, based on more recent input data, by a preceding one of the individual computers.

The given computer is thereby able to use the more recent data from the other computers, so that the accuracy of the ultimate answer is significantly improved. The intercommunication provided through the memory, as described in the aforementioned copending application Ser. No. 221,544, allows all units to make available to all other units the most recent input and intermediate computations.

Figure 2:
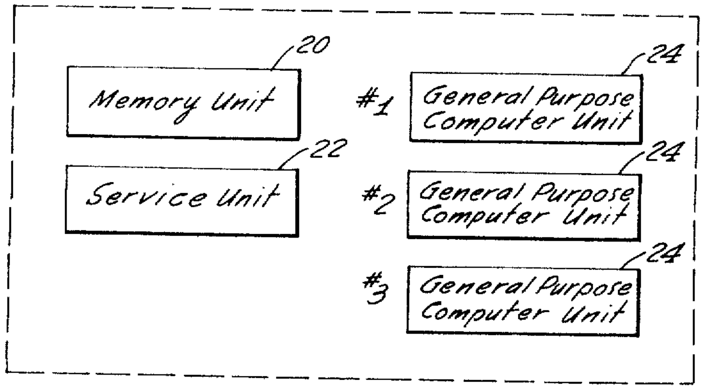
FIGURE 2 is a block diagram representative of the common memory and service unit, and the individual general purpose computers which make up one embodiment of the building block computer of the invention.

The building block computer, as shown in FIGURE 2, includes a common memory unit 20. This memory unit may be a usual magnetic memory drum, which is rotatably mounted, as well as the usual transducer heads and other components associated with the drum. As is the usual practice, different channels on the drums are allocated for storing different computer words, in the form of operands and instructions, the operands being stored in a plurality of sector positions in each of the individual channels.

A service unit 22 is also provided, and this unit functions in a manner to be described, to control the operation of the building block computer. Also provided are a plurality of individual general purpose computers 24. Although three of these computers are shown in the diagram of FIGURE 2, it will be appreciated that any appropriate number of general purpose computers may be provided.

Figure 3:
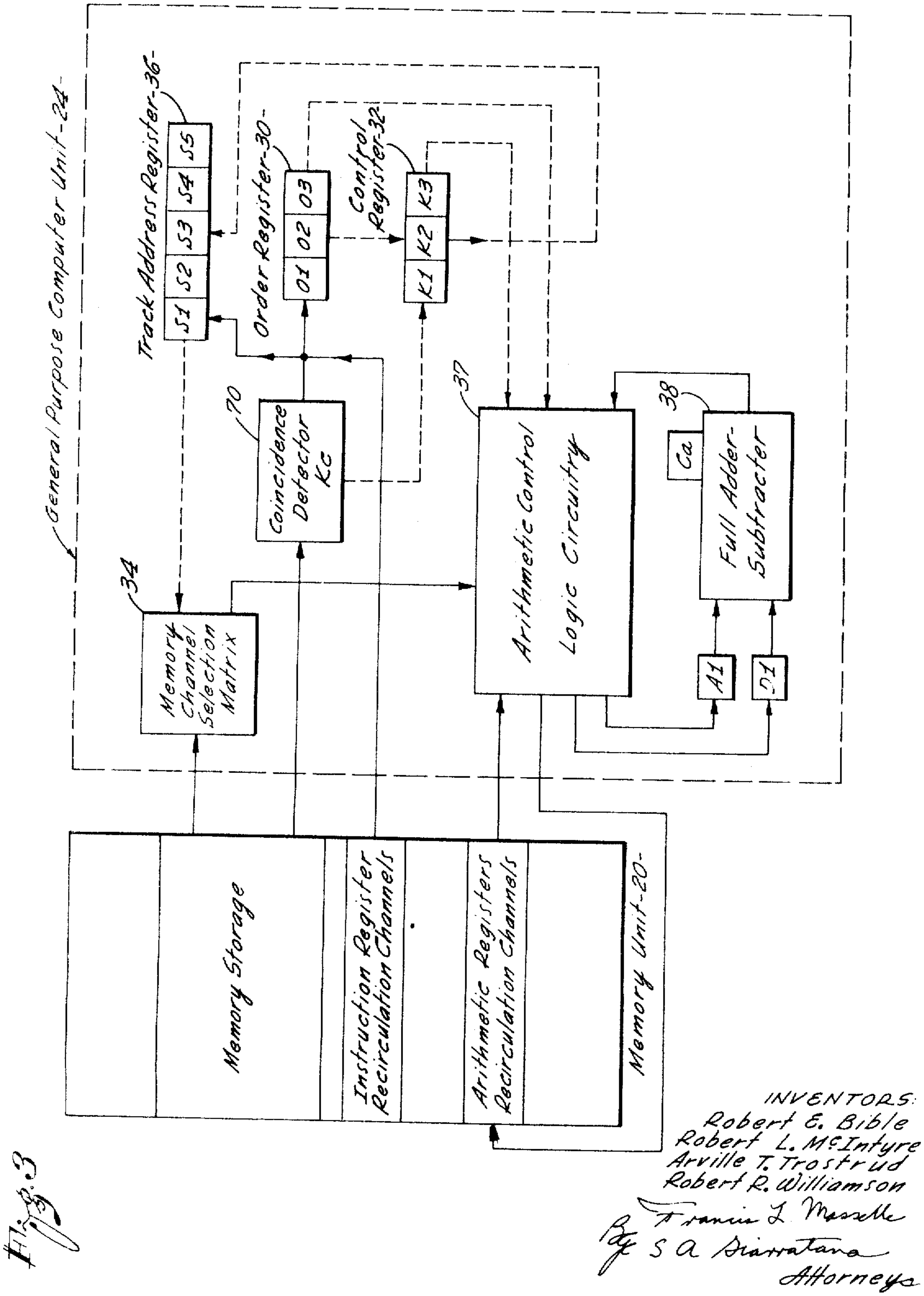
FIGURE 3 is a block diagram of the components which make up each of the general purpose computers included in the building block computer, and also showing portions of the common memory unit which are coupled to the various components of the individual computers.

The components of each of the general purpose computers 24 are shown in more detail in FIGURE 3. The computer 24, when provided with power and timing signals from the common service unit 22, functions as an independent general purpose computer. Each of the computers 24 is provided with its own read heads for access to the common memory unit 20, and each has its own recirculating instruction register channels, as described in the copending application Ser. No. 221,544.

As shown in FIGURE 3, and as will be described in more detail subsequently, each general purpose computer 24, in the particular example under consideration, includes an order register 30 which is composed of flip-flops O1, O2 and O3. Each computer 24 also includes a control register 32 which is composed of flip-flops K1, K2 and K3.

The access to the memory storage channels of the common memory unit 20 is provided by a memory channel selection matrix 34, this selection matrix being controlled by a track address register 36. The track address register 36 is made up of a plurality of flip-flops S1, S2, S3, S4 and S5. Sector addressing in the different channels of the memory storage is provided by a coincidence flip-flop Kc in a coincidence detector 70.

As mentioned above, each of the individual computers 24 may have its own circulating instruction register channel (I) (FIGURE 4), on the common memory unit, and this register operates in conjunction with the order register 30, as will be described.

Each computer 24 also includes arithmetic control logic circuitry 37. This logic circuitry operates in conjunction with a plurality of arithmetic registers which, in turn, include individual circulation channels on the memory unit 20, as shown in FIGURE 3.

The arithmetic control logic circuit 37 is coupled through a pair of flip-flops A1 and D1 to an adder-subtractor network 38. The adder-subtractor network has a carry flip-flop *Ca* associated therewith. The output from the adder-subtractor 38 is fed back into the arithmetic control logic 37. Each of the computers may have its own arithmetic circulating register channels on the common memory unit 20.

Figure 4:
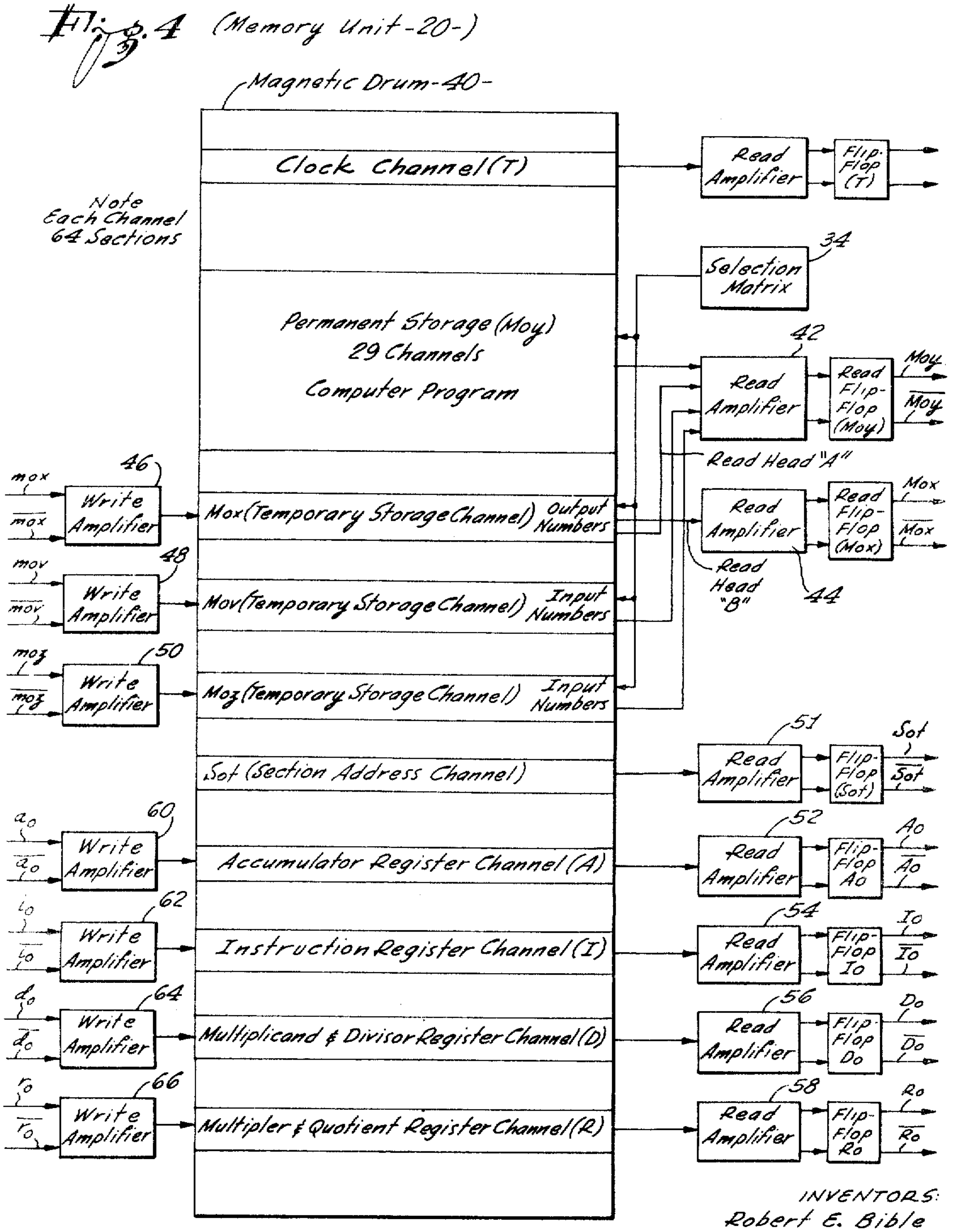
FIGURE 4 is a more detailed block diagram of the common memory unit, and its associated components.

The common memory unit 20 is shown in somewhat more detail in FIGURE 4. The memory, for example, may be in the form of a rotatable magnetic drum, such as shown in FIGURES 3 and 4. Alternately, it may be in the form of one or more magnetic discs, or any other appropriate memory may be used.

In the embodiment shown in FIGURE 4, the memory unit 20 includes a rotatable magnetic drum 40. The information is recorded on the magnetic drum 40 in a plurality of channels which extend around the periphery of the drum and which are spaced along the drum, one adjacent the other. The information is stored in the form of computer words in each of a plurality of sectors which, in turn, are contained in the individual channels.

The channels on the drum have corresponding read heads at various access points, which are associated with the different computers 24. Certain of the channels have corresponding write heads which can be controlled to write data on the channels. In this manner, information may be communicated between the individual computers. For example, a particular computer 24 may store an intermediate result in a temporary storage channel on the memory, and a further computer 24 may utilize the results in its computations.

Each of the channels on the drum 40 has, for example, 64 sectors in a particular embodiment. A 25-bit computer word may be recorded in each sector. The drum 40 may contain, for example, a plurality of channels which constitute the permanent storage for the general purpose computer unit. The different instructions which make up the program of the building block computer may be stored in these channels. The channels in question will be referred to, for example, as the ($M_{oy}$) channels, and they contain the computer program.

The memory drum 40 may also contain temporary storage channels for input numbers and output numbers from the individual computers, and the individual computers may be controlled to write their output results in the ($M_{ox}$) temporary storage channel, for example, and to receive inputs from the ($M_{ov}$) or ($M_{oz}$) temporary storage channels.

The selection matrix 34 of FIGURE 3 is coupled to the read heads associated with the ($M_{oy}$) channels at the corresponding point of access of a particular computer 24. This selection matrix is also coupled to certain of the read heads associated with the ($M_{ox}$), ($M_{ov}$) and ($M_{oz}$) channels. These read heads are all coupled to a read amplifier 42 which, in turn, is coupled to a read flip-flop $M_{oy}$.

Any of the read heads associated with the different ($M_{oy}$) channels, or any one of the read heads associated with the ($M_{ox}$), ($M_{ov}$) and ($M_{oz}$) channels, may be selected by the selection matrix 34, so that output signals from the selected read head may be introduced to the read amplifier 42 to actuate the read flip-flop $M_{oy}$.

The ($M_{ox}$) temporary storage channel has an additional read head, which is coupled to a read amplifier 44, the read amplifier, in turn, being coupled to the input terminals of a read flip-flop M*ox*. The read flip-flop $M_{ox}$ produces its output terms regardless of the control exerted on the other read heads by the selection matrix 34.

The ($M_{ox}$), ($M_{ov}$) and ($M_{oz}$) channels include respective write amplifiers 46, 48 and 50 which are connected to corresponding ones of the write heads associated with the channels.

It will be appreciated, and as mentioned above, each of the different computers 24 includes amplifiers and read and write heads, such as those described above, which are coupled to the ($M_{ox}$), ($M_{ov}$) and ($M_{oz}$) channels of the memory drum 40, at different points of access. These components are controlled so that each individual computer unit 24 responds to the computer program in the manner indicated schematically in FIGURE 1.

The rotatable magnetic memory drum also includes an arithmetic accumulator register channel A, an instruction register channel I, an arithmetic multiplicand and divisor register channel D, and an arithmetic multiplier and quotient channel R. Although only one each of these channels is illustrated in FIGURE 4, it is preferable that a separate one of each of the respective channels be provided for each of the individual computer units.

The read heads associated with the various register channels enumerated in the preceding paragraph are coupled to a corresponding plurality of read amplifiers 52, 54, 56 and 58. The read amplifier 52 controls the flip-flop A*o* which is included in the accumulator register A. The read amplifier 54 controls a flip-flop I*o* which is included in the instruction register I. The read amplifier 56 controls a flip-flop D*o* which is included in the multiplicand and divisor register D. The read amplifier 58 controls the flip-flop R*o* which is included in the multiplier and quotient register R. A plurality of write amplifiers 60, 62, 64 and 66 are respectively coupled to the write heads associated with respective ones of the register channels.

Each general purpose computer 24 is composed functionally of a control unit, an individual memory unit, and an arithmetic unit. These latter units are shown in block form in FIGURES 5, 6 and 7.

Figure 5:
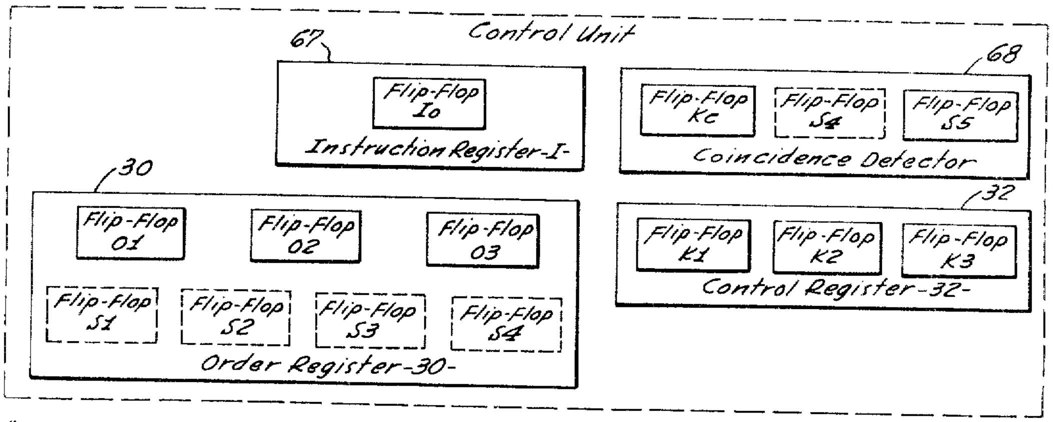
FIGURES 5–7 illustrate in block form the various flip-flops which are included in the different components of each of the individual general purpose computers.

As shown in FIGURE 5, the control unit of each general purpose computer 24 includes the order register 30 and control register 32 described in FIGURE 3. The control unit may also be considered to include its corresponding instruction register I on the memory drum 40. It also includes a coincidence detector 68 which is made up of the coincidence flip-flop K*c* of FIGURE 3, and the track address flip-flops S4 and S5.

Figure 6:
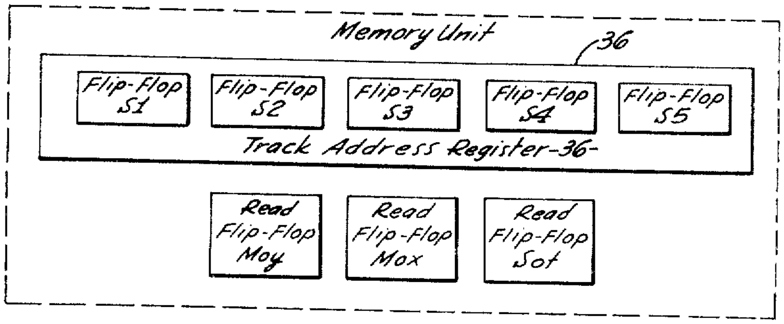

The individual memory unit of the general purpose computer 24, as shown in FIGURE 6, includes the track address register 36 which, in turn, includes the flip-flops S1–S5. The individual memory unit of FIGURE 6 may also be considered to include the read flip-flops $M_{oy}$ and $M_{ox}$ associated with the corresponding computer. This unit also includes (functionally) a read flip-flop $S_{ot}$ of the common service unit 22.

As shown in FIGURE 4, the magnetic drum 40 includes a sector address channel designated as the ($S_{ot}$) channel. This channel identifies by successive recorded sector address numbers the various sectors as the magnetic drum rotates. The sector address system includes a read head which is coupled through a read amplifier 51 to the $S_{ot}$ flip-flop.

Figure 7:
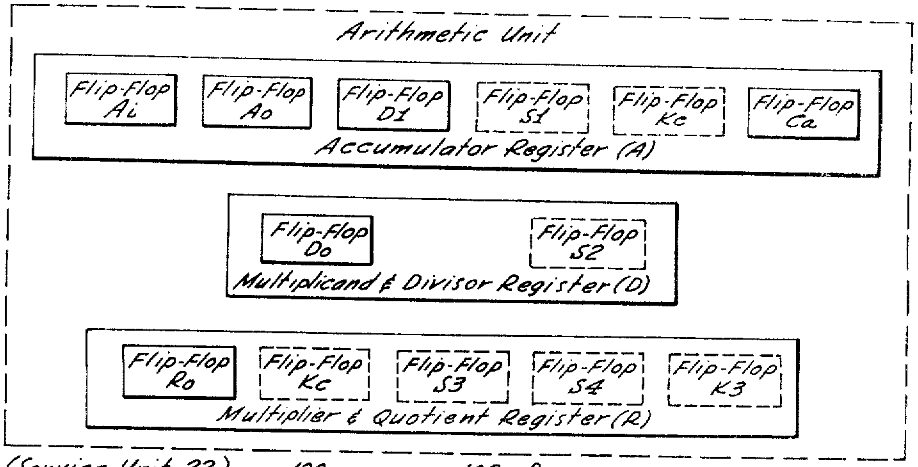

The arithmetic unit of FIGURE 7 is made up of a corresponding accumulator register A, including a channel on the memory drum 40; a corresponding multiplicand and divisor register D, including a channel on the drum; and a corresponding multiplier and quotient register R, which also includes a channel on the drum 40. The accumulator register A includes the flip-flops A1 and A*o*, as well as the flip-flop D1, S1, K*c* and C*a*. The multiplicand register includes the flip-flops D*o* and S2. The multiplier register R includes the flip-flops R*o*, K*c*, S3, S4 and K3. These flip-flops are used on a time shared basis when not performing their primary function.

Appropriate logic circuitry is associated with the various flip-flops included in the units of FIGURES 5, 6 and 7, and with the write amplifiers of FIGURE 4. This logic circuitry may assume any appropriate configuration, known to the digital computer art. Its particular composition forms no part of the present invention.

A block schematic diagram showing functionally the control and memory access of each of the general purpose computers 24 is shown in FIGURE 8. The composition of a typical instruction word is illustrated in FIGURE 9.

The instruction word, as shown in FIGURE 9, includes an alpha sector number (P8–P3) and an alpha track number (P13–P9) which are used to specify the address of the next instruction. The instruction word of FIGURE 9 also includes a beta sector number (P24–P19) and a beta track number (P18–P14) which are used to specify the address of the operand.

The instruction word of FIGURE 9 also includes an order portion at the three least significant bit positions (P2–P0). This order portion appears in the flip-flops O1, O2 and O3 of the order register 30, and the resulting configuration of these flip-flops specifies the type of operation to be performed in accordance with a preconceived order code.

It will be appreciated that the terms P0–P24 represent the bit timing pulses which are received from the service unit 22, and these pulses serve to identify the successive bit times of each word. The service unit includes, for example, a bit timing counter 102 (FIGURE 10) which is synchronized with the rotation of the drum 40 by responding to the clock pulses on the drum, as derived from the flip-flop (T) (FIGURE 4). This bit timing counter, for example, supplies the bit timing pulses to all the computer units, so that all the units function, for example, in synchronism with respect to the bit timing.

In the block schematic diagram of FIGURE 8, the control unit is shown as including the instruction register I*o*, the coincidence detector 70, the control register 32, and the order register 30. A gate 80 is interposed between the instruction register and the coincidence detector 70.

The memory unit is illustrated in FIGURE 8 as including the track address register 36, the selection matrix 34, the magnetic memory drum 40 (which is in reality common to all the computer units), and the read amplifier 51 and associated flip-flop $S_{ot}$ (these, likewise, being common to all the computer units and being contained in the service unit 22).

The $M_{oy}$ flip-flop of the magnetic memory drum 40 introduces its output signals to a pair of gates 84 and 86. These gates are under the control of the control flip-flops K1, K2 and K3 in the control register 32, and they open when a designated sector is reached. The gate 84 is connected to the instruction register I*o* and to the order register 30. The gate 86, on the other hand introduces its output directly to the arithmetic unit. The gate 84 passes the instructions selected from the memory drum 40 to the instruction register, whereas the gate 86 passes the selected operands to the arithmetic unit. The order register 30 specifies the operation to be performed on the operand in the arithmetic unit.

As each instruction word is read into the instruction register, it is shifted through the order register 30. At the completion of each instruction read-in operation, the last three digits of the particular instruction word, corresponding to the order code, remain in the order register 30.

A gate 88 is controlled by the control register 32 so that the track address of each operand and instruction word to be executed is fed from the instruction register I*o* to the track address register 36 in the memory unit. This latter register causes the selection matrix 34 to select a particular track or channel in the $M_{oy}$ group on the magnetic drum 40.

The gate 80 is controlled by the control register 32 to pass the sector number from each operand and next instruction to the coincidence detector 70, so that they may be compared with the successive sector address numbers derived from the sector address flip-flop $S_{ot}$ which, in turn, is coupled to the sector address track ($S_{ot}$) on the magnetic memory drum 40, as mentioned above. When coincidence occurs, the control register 32 is set to enable either the gate 84 or the gate 86 at the proper time to pass the word in the selected sector.

Each general purpose computer 24 is capable of undergoing, for example, seven different phases under the control of the control flip-flops K1, K2, K3 of the control register 32. The seven different phases which may occur do not all occur for any one operation.

It will be appreciated, and as indicated above, that for any individual computer 24, it is controlled so that it performs the program with a predetermined time relation with the other computers as indicated schematically in FIGURE 1, so that answers are provided by the different computers at regularly spaced intervals, to be repeated periodically.

(1) The "wait alpha phase" ($W_A$) during which a search is made for the next instruction, and for which the control flip-flops are set to the $\overline{K1}\cdot\overline{K2}\cdot\overline{K3}$ configuration. When these flip-flops are in this configuration, the gate 88 of FIGURE 8 is opened from P13 to P9 digit times. This enables the flip-flops S1–S5 of the track address register 36 to be set to a configuration corresponding to the alpha track number of the next instruction, as designated in the instruction circulating in the instruction register I*o* (FIGURE 9). This, as noted above, is the track number of the next instruction.

Then, the gate 80 is opened from P8–P3 digit times of the "wait alpha phase" ($W_A$) for each word time of the instruction word circulating in the instruction register; this is so that the alpha sector number in the circulating instruction word may be compared in the coincidence detector 70 with the sector numbers on the ($S_{ot}$) channel of the memory drum 40. When coincidence occurs, the coincidence flip-flop (K*c*) causes the control flip-flop (K1) to be triggered true so that the computer enters its next phase for an interval corresponding to the following sector on the drum. The next phase is known as the "Instruction Read-in" (I*r*) phase.

(2) The second phase of the general purpose digital computer sub-system is, as noted above, the "Instruction Read-in" phase (I*r*). During the instruction read-in phase, the next instruction is read from the selected ($M_{oy}$) track and sector of the magnetic memory drum 40 through the gate 84 of FIGURE 8 into the instruction register (I*o*). When coincidence is achieved by the coincidence detector 70 in the ($W_A$) phase, the control flip-flop (K1) is triggered true. This causes the control flip-flops to have the configuration $K1\cdot\overline{K2}\cdot\overline{K3}$ for the (I*r*) phase. When this occurs, the gate 84 of FIGURE 8 is enabled for one word time to permit the next instruction to be read into the instruction register (I*o*). The instruction also shifts into and through the flip-flops O1, O2 and O3 of the order register 30, as mentioned above, and at the end of the (I*r*) phase, the last three digits P2, P1 and P0, corresponding to the order code, remain in the order register. The new instruction now circulates in the instruction register (I*o*), and it continues to circulate until the next time that an instruction read-in phase (I*r*) is established.

(3) The third phase of the computer is the "Wait for Beta" ($W_B$) phase. For this latter phase, the control flip-flops of the control register 32 are set to a $\overline{K1}\cdot K2\cdot K3$ configuration. This causes the gate 88 of FIGURE 8 to be enabled for P18–P14 bit times of the instruction word circulating in the instruction register (I*o*). This, in turn, permits the track number in that instruction to set the flip-flops of the track address register 36 to a configuration corresponding to the track on the memory drum 40 in which the desired operand occurs.

Then, for the P24–P19 digit time of each word time of the instruction word in the instruction register (I*o*), the gate 80 is enabled. The latter operation enables the beta sector number in the instruction to be compared with the sector numbers in the ($S_{ot}$) channel on the drum. When equality is reached, the flip-flop (K2) is triggered false and the gate 86 is rendered conductive. This places the digital computer sub-system in the "first word phase" (F*w*) for the following word time, during which the selected operand is read into the arithmetic unit.

There are several exceptions to the normal operation of the general purpose computer sub-system described in the preceding paragraph. For example, when the operation specified is a conditional transfer (I*c*), the ($W_B$) phase returns to the ($W_A$) phase at P24 bit time if the contents of the accumulator register (A) are negative. Otherwise, the beta address specifies the address of the next instruction rather than the address of an operand, and when the instruction is found the I*r* phase is entered, instead of going to the F*w* phase.

Another exception is for a normal store order (S*r*). Here, the beta address of the instruction being executed specifies where the contents of the accumulator register (A) are to be stored in the memory unit 40. For the modified store orders, the beta address specifies any one of several operations, which will be explained.

(4) The fourth phase of the computer is the "first word" (F*w*) phase, as mentioned above. To enter this phase from the third phase ($W_B$), the control flip-flop K2 is triggered false. This occurs when an equality is reached in the coincidence detector 70 between the beta sector number in the instruction word circulating through the instruction register (I*o*) and the corresponding number on the ($S_{ot}$) track on the magnetic drum.

Now, as noted above, the gate 86 of FIGURE 8 is enabled for one word time, and the selected operand flows from the magnetic memory drum into the arithmetic unit. This operand may be selected from one of the ($M_{oy}$) channels of the drum, or it may be selected from one of the ($M_{ox}$), ($M_{ov}$), ($M_{oz}$) channels, under the control of the selection matrix 34.

When the selected operand is read into the arithmetic unit during the (F*w*) phase, an operation is performed on it during that phase. This operation is dictated by the configuration of the flip-flops O1, O2 and O3 in the order register 30, and in accordance with the order code of FIGURE 9.

For the A*t* (clear and transfer), S*u* (subtract), A*d* (add), E*x* (extract) and S*r* (normal store) instructions, the operation is completed in this phase. For the M*u* (multiplication) instruction, the multiplicand is read into the (D) register, and the first step of the multiplication is completed, with the partial product being placed in the accumulator register (A) in this phase (F*w*). For the D*v* (divisional) instruction, the divisor is read into tne (D) register during this (F*w*) phase, and the R register is cleared to zero during this phase. No operation occurs during the first word (F*w*) phase for the modified store orders.

(5) The fifth phase of operation of the general purpose computer sub-system is the "additional words" (A*w*) phase. The flip-flops K1, K2 and K3 of the control register 32 are set to the $K1 \cdot \overline{K2} \cdot K3$ configuration for this phase. In this latter phase, the division operation is completed, and all but the last step of the multiplication operation is completed. Moreover, the special operations of the modified store order are completed in this phase.

(6) The sixth phase of the general purpose computer sub-system is the last word (L*w*) phase. The control flip-flops K1, K2, K3 are set to the $K1 \cdot \overline{K2} \cdot \overline{K3}$ configuration. For this phase, the multiplication operation is completed, and the quotient is transferred from the (R) register to the (A) register for division.

(7) The seventh phase is the "stop" phase (S*p*). In this latter phase, the control flip-flops K1, K2 and K3 are set to the $K1 \cdot K2 \cdot K3$ configuration. For the "stop" phase (S*p*), all computations are terminated, and the computer is turned off, if the control switch is in the "off" position.

The accumulator A in FIGURE 8 stores the results of all the operations performed by the adder 38 (FIGURE 3) of the corresponding digital computer 24.

Figure 10:
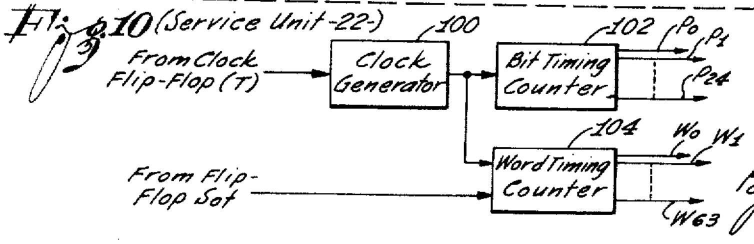
FIGURE 10 is a block diagram of the common service unit, and its associated components.

The common service unit 22 is shown in block form in FIGURE 10. This unit responds to the clock pulses which are read from the clock channel T (FIGURE 4) through a read amplifier 59 to a clock flip-flop T. The output from the clock flip-flop T is applied to a clock generator 100 in the service unit. The clock generator 100 controls a bit timing counter 102 which, in turn, generates the bit timing pulses P0–P24, which are used by all the computer units 24.

The output from the clock generator 100 also controls a word timing counter 104. This latter counter produces output pulses corresponding to the different word times for each revolution of the drum 40. This counter, for example, is also synchronized by the $S_{ot}$ pulses from the sector address channel on the drum, so that it may be synchronized with the sector addresses in that channel.

In initiating the operation of the building block computer, the instruction registers I*o* of all the modules are initially filled, for example, with binary 1's. All the modules are set to the "stop" phase $(Sp)(K1 \cdot K2 \cdot K3)$.

The modules are then all set to the "Instruction Read-in" phase $(Ir)(K1 \cdot K2 \cdot \overline{K3})$ at the same word time. Thus the gate 84 of each module is enabled for one word time, with all of the gates 84 being enabled at the same time.

Thus, each module initially picks up a different instruction, and this causes the modules to be placed in different locations on the program cycle, as shown in FIGURE 1.

Since all the instruction registers were initially filled with 1's, for example, the modules will all be directed to a selected track in the memory, from which to select their initial instructions.

Once the program cycle has been initiated, sub-routines are established in known manner which serve to identify the different modules. The identification of the modules is based on their respective starting locations, and the individual storage tracks on the memory are used to remember the identity of each module.

In all subsequent decisions concerning the placement of the modules on the program cycle, other sub-routines are established which check the individual modules. These sub-routines produce specific answers which are placed in common storage for comparison. The results are then used to aid in establishing new starting locations of the individual modules on the program cycle, when one or more of the modules fails; these new locations being based upon the location and number of the remaining modules. Means is provided, as mentioned above, for removing the inoperative modules.

The invention provides, therefore, a high speed building block computer which is highly flexible and most reliable. An important advantage of the computer is that failure of any individual module does not result in a complete failure of the computer.

In addition, the building block computer of the invention is capable of achieving high speed and highly accurate computations with relatively inexpensive equipment.

What is claimed is:

1. A digital computer including: a memory unit; a plurality of separate digital computer units; means coupling said computer units to said memory unit to derive common information including a repeated sequence of instructions therefrom and to supply such common information to respective ones of said digital computer units so as to enable each of said digital computer units to perform the same computations on such information; a common service unit coupled to said memory unit and to said digital computer units for controlling the timing of said digital computer units; and control means coupled to said digital computer units for controlling the introduction of the sequence of instructions in said memory unit to respective ones of said digital computer units so that said sequence is applied periodically to said digital computer units but at different times to each of said digital computer units.

2. The computer defined in claim 1 in which said computer units are coupled to said memory unit at different points of access to said memory.

3. The computer defined in claim 1 in which said memory unit includes a rotatable magnetic storage member, and in which said computer units are magnetically coupled to said storage member at different points of access thereto.

4. The combination defined in claim 1 in which said service unit includes counter means responsive to clock signals from said memory unit for supplying bit timing signals and word timing signals to said digital computer units.

5. The digital computer defined in claim 1 in which said digital computer units derive said common information at equidistantly spaced points around a recurring program cycle.

6. The digital computer defined in claim 1, in which said digital computer units derive said common information at predetermined spaced points around a recurring program cycle.

References Cited by the Examiner

UNITED STATES PATENTS

| | | | |
|---|---|---|---|
| 2,950,464 | 8/1960 | Hinton et al. ---- | 340—146.1 X |
| 3,158,844 | 11/1964 | Bowdle ---------- | 340—174.1 |

ROBERT C. BAILEY, *Primary Examiner.*

P. L. BERGER, J. P. VANDENBURG, *Assistant Examiners.*